US011565174B2

(12) United States Patent
Squire et al.

(10) Patent No.: US 11,565,174 B2
(45) Date of Patent: Jan. 31, 2023

(54) TWIST-LOCK DIRECTIONAL INPUT DEVICES FOR GAMEPADS

(71) Applicant: Microsoft Technology Licensing, LLC, Redmond, WA (US)

(72) Inventors: Beau Tomas Squire, Sultan, WA (US); James Anthony Trzaskos, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/314,888

(22) Filed: May 7, 2021

(65) Prior Publication Data

US 2022/0355192 A1 Nov. 10, 2022

(51) Int. Cl.
*A63F 13/245* (2014.01)
*A63F 13/98* (2014.01)
*A63F 13/24* (2014.01)

(52) U.S. Cl.
CPC ............ *A63F 13/245* (2014.09); *A63F 13/24* (2014.09); *A63F 13/98* (2014.09)

(58) Field of Classification Search
CPC ......... A63F 13/24; A63F 13/245; A63F 13/98
See application file for complete search history.

(56) References Cited

U.S. PATENT DOCUMENTS

| | | | | |
|---|---|---|---|---|
| 6,359,614 | B1* | 3/2002 | McVicar | G05G 1/06 345/157 |
| 9,710,072 | B1* | 7/2017 | Strahle | G06F 3/033 |
| 9,908,041 | B2* | 3/2018 | Kujawski | A63F 13/00 |
| 2005/0255915 | A1* | 11/2005 | Riggs | A63F 13/24 463/37 |
| 2008/0293472 | A1 | 11/2008 | Strawn et al. | |
| 2016/0317920 | A1* | 11/2016 | Schmitz | A63F 13/00 |
| 2016/0317921 | A1* | 11/2016 | Schmitz | A63F 13/23 |
| 2016/0354685 | A1* | 12/2016 | Kujawski | A63F 13/24 |
| 2016/0361634 | A1* | 12/2016 | Gassoway | G06F 3/0338 |
| 2016/0361636 | A1* | 12/2016 | Gassoway | A63F 13/24 |
| 2017/0001106 | A1* | 1/2017 | Gassoway | G05G 9/047 |
| 2017/0106274 | A1* | 4/2017 | Ramcheran | A63F 13/24 |

(Continued)

FOREIGN PATENT DOCUMENTS

| | | |
|---|---|---|
| CN | 209575734 U | 11/2019 |
| EP | 0347491 A2 | 12/1989 |

OTHER PUBLICATIONS

"International Search Repod & Written Opinion issued in PCT Application No. PCT/US22/024720", dated Aug. 24, 2022, 17 Pages.

(Continued)

*Primary Examiner* — Chase E Leichliter
(74) *Attorney, Agent, or Firm* — Ray Quinney & Nebeker P.C.; John O. Carpenter

(57) ABSTRACT

A directional input device includes a base and a head selectively connected to the base by a twist-lock mechanism. The head and base define a center axis of the directional input device. The twist-lock mechanism includes a post oriented in an axial direction of the center axis, at least one flange protruding in a radial direction from the post, a receiver configured to receive the post and the flange, and an angularly oriented channel in the receiver configured to allow the post and flange to rotate into the channel and capture the flange in the axial direction.

20 Claims, 7 Drawing Sheets

(56) References Cited

U.S. PATENT DOCUMENTS

| | | | |
|---|---|---|---|
| 2018/0178117 A1* | 6/2018 | Kujawski | A63F 13/98 |
| 2018/0333641 A1* | 11/2018 | Strahle | A63F 13/24 |
| 2018/0353850 A1* | 12/2018 | Strahle | A63F 13/98 |
| 2019/0060746 A1* | 2/2019 | Ironmonger | A63F 13/24 |
| 2020/0086211 A1* | 3/2020 | Goerz | A63F 13/24 |
| 2020/0164269 A1* | 5/2020 | Palmer | A63F 13/24 |
| 2022/0274012 A1* | 9/2022 | Spiering | A63F 13/24 |

OTHER PUBLICATIONS

"Invitation to Pay Additional Fees Issued in PCT Application No. PCT/US22/024720", Mailed Date: Jun. 30, 2022, 9 Pages.

* cited by examiner

TWIST-LOCK DIRECTIONAL INPUT DEVICES FOR GAMEPADS

BACKGROUND

Background and Relevant Art

Electronic device controllers allow users to quickly provide directional inputs to a video game console or other computing device. Joysticks, thumbsticks, directional pads, and other directional input devices can allow for analog or digital directional inputs with an electronic device controller. The directional input sticks or pads move within a range of motion relative to a controller body. Tactile feedback and/or precision can have a large effect on the performance of the directional input device, and preferences regarding a shape, mass, dimension, or texture of the directional input device can be specific to different users.

BRIEF SUMMARY

In some implementations, a directional input device includes a base and a head selectively connected to the base by a twist-lock mechanism. The head and base define a center axis of the directional input device. The twist-lock mechanism includes a post oriented in an axial direction of the center axis, at least one flange protruding in a radial direction from the post, a receiver configured to receive the post and the flange, and an angularly oriented channel in the receiver configured to allow the post and flange to rotate into the channel and capture the flange in the axial direction.

In some embodiments, a directional input device includes a base, a head selectively connected to the base by a twist-lock mechanism, and a shaft between the base and the head along a center axis. The twist-lock mechanism is axially within the shaft and includes a post oriented in an axial direction of the center axis, at least one flange protruding in a radial direction from the post, a receiver configured to receive the post and the flange, an angularly oriented channel in the receiver configured to allow the post and flange to rotate into the channel and capture the flange in the axial direction, and a rotational lock between the receiver and the post that limits and/or prevents rotation of the post relative to the receiver when in a locked position. The rotational lock includes at least one axial protrusion, and a complementary axial detent.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1-2 is a side perspective view of the electronic device controller of FIG. 1-1;

FIG. 2-1 is a perspective exploded view of a twist-lock directional input stick with ramped surfaces, according to at least some implementations of the present disclosure;

FIG. 2-2 is a bottom perspective exploded view of the twist-lock directional input stick of FIG. 2-1;

DETAILED DESCRIPTION

The present disclosure relates generally to systems and methods for providing user inputs to an electronic device. More particularly, the input devices described herein are configured to allow directional inputs to a computing device or a specialized video game console. In some implementations, an input device according to the present disclosure is an electronic device controller that may be in data communication with an electronic device, such as a personal computer or video game console. In some implementations, a controller is in data communication via a wired data connection. In other implementations, the controlled is in wireless data communication.

Controllers include directional input devices to allow a user to indicate a direction an on-screen cursor or avatar should move relative to an environment. In some instances, an analog or digital thumbstick is appropriate to provide directional inputs to move an avatar in a relation to a three-dimensional virtual environment. For example, the analog thumbstick allows a gradient of input magnitudes with an associated directional component that allows for control of an avatar from a slow walk through a full run in the virtual environment.

In other instances, a cross-shaped directional input pad is appropriate to provide discrete directional control. For example, an analog input device can be unpredictable for a user in a menu selection screen with discrete options. Inputs from the analog input device may produce no movement of a cursor between the discrete options until a threshold of the analog input device is met, at which point the cursor may move unexpectedly, producing imprecise control for the user. In other examples, some applications and video games interpret series of discrete directional inputs as special commands that evoke unique techniques of the user's avatar or unlock additional features of the application or video game. In at least one example, a fighting video game interprets a precise series of directional inputs as a special command to attack using a projectile attack. In other examples, a particular series of directional inputs provided by a user at a menu screen unlocks additional options or resources.

Figure 1:
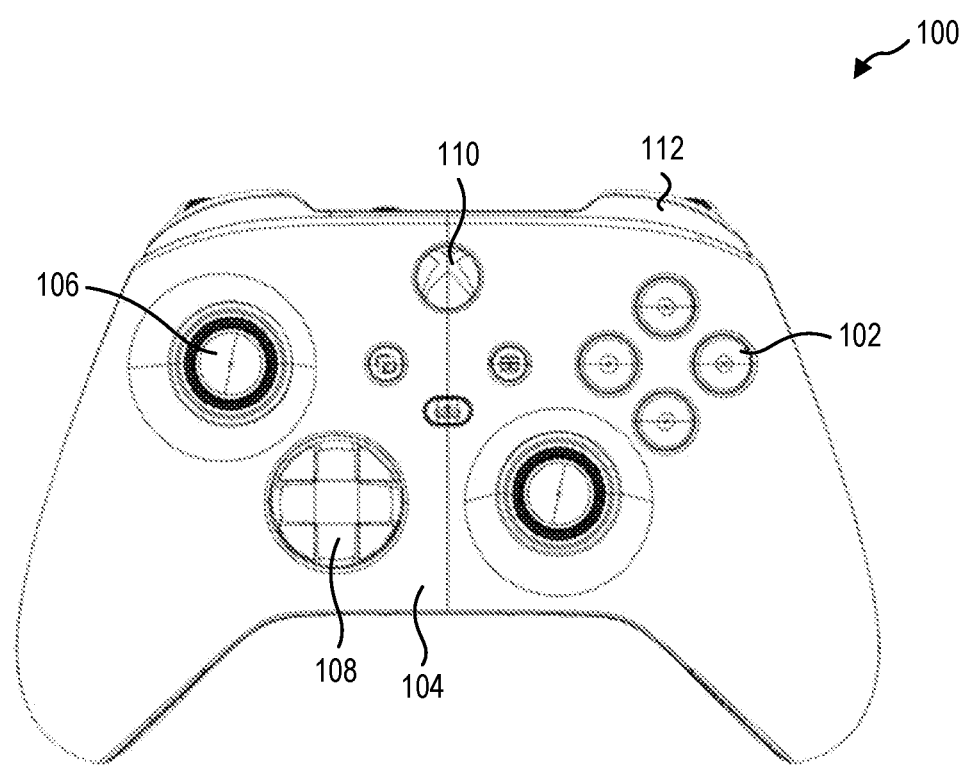
FIG. 1-1 is a top view of an electronic device controller.

Referring now to FIG. 1, in some implementations, an electronic device controller 100 includes a plurality of other input buttons 102 located on a body 104 of the controller 100 with the directional input devices. The directional input devices may include one or more analog thumbsticks 106 and/or one or more directional input pads 108. The controller 100 may further include one or more menu or system buttons 110, shoulder buttons 112, trigger buttons, rear paddles, etc.

The thumbstick 106 may be used to control the movement of an avatar or cursor in a two- or three-dimensional virtual environment. As such, rapid inputs can require rapid movement of the thumbstick 106, which may produce noise or tactile vibration upon contact between the thumbstick 106 and the body 104.

Figures 1, 2:
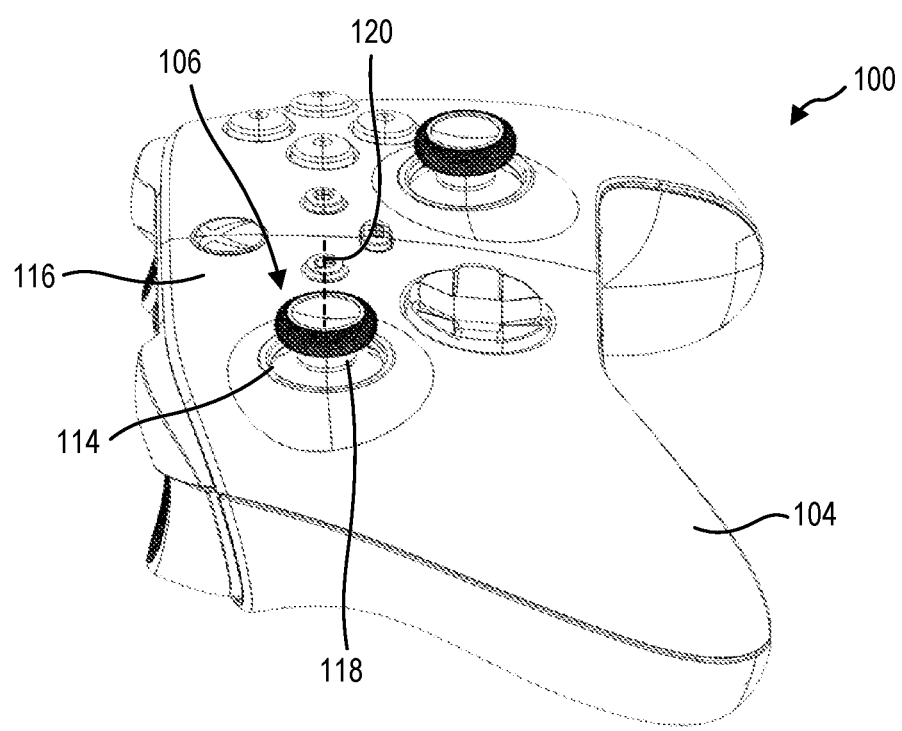
Figures 1, 2:
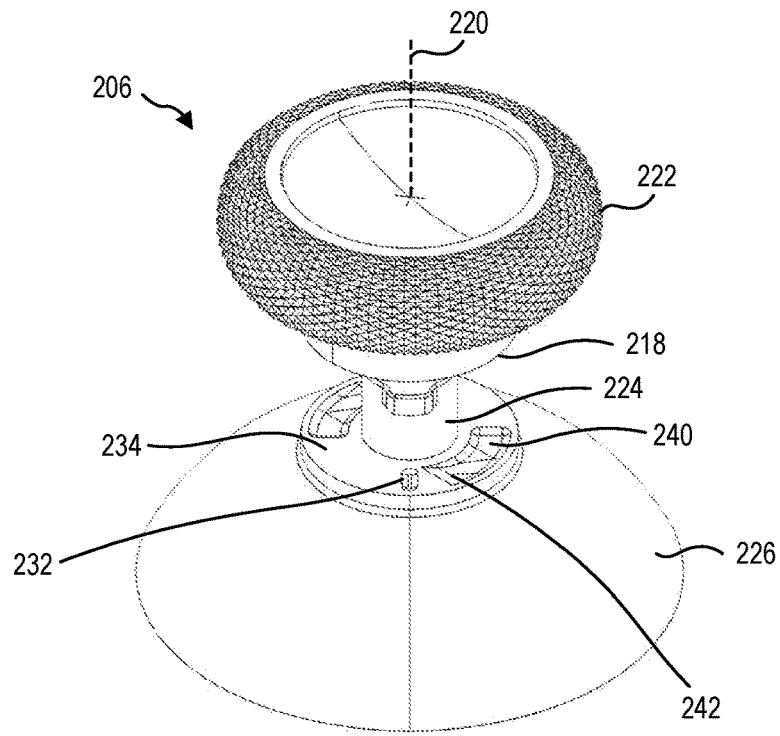
Figure 2:
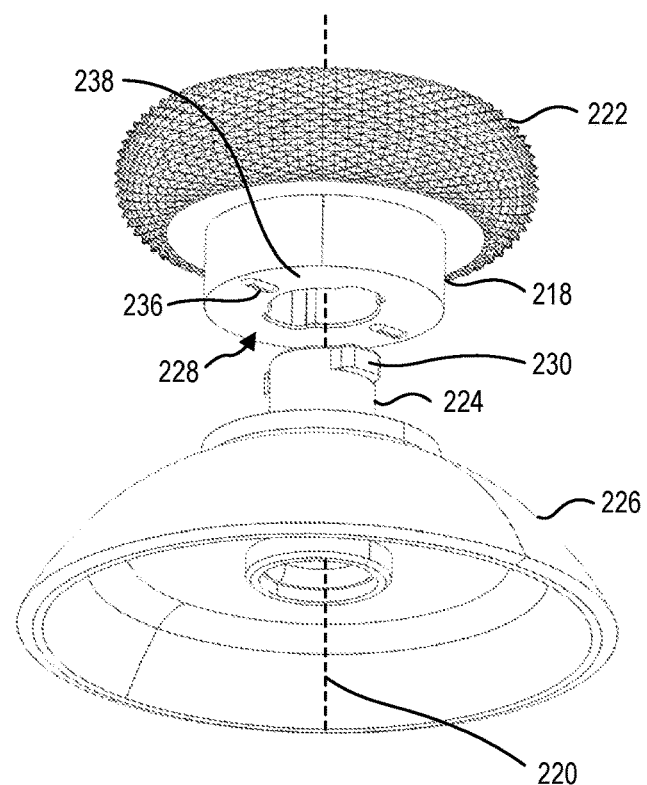

FIG. 1-2 is a side perspective view of the electronic device controller 100 of FIG. 1-1. The thumbstick 106 is located in an aperture 114 through the top face 116 of the controller body 104. The thumbstick 106 is movable relative to the body 104 by tilting the thumbstick 106 to translate and rotate a shaft 118 of the thumbstick 106 toward an edge of the aperture 114. The shaft 118 may contact the edge of the aperture, producing a sound and vibration through electronic device controller 100. In some implementations, the aperture 114 is circular, such that a range of motion of the thumbstick 106 is rotationally symmetrical about a center axis 120 of the thumbstick 106. In other implementations, the aperture 114 is non-circular or asymmetrical to allow different amounts of motion in different directions relative to the center axis 120.

The size, shape, texture, or other properties that affect the range of movement or the feeling of a directional input device, such as a directional input stick or a directional input pad, may be changed by changing a portion of the directional input device that the user touches. Different users may prefer directional input devices with different sizes, shapes, textures, or symmetry. In some examples, a user may prefer different directional input devices for different games. For example, a user may prefer a cross-style directional input pad for a classic arcade game, such as Tetris, and a dish-style directional input pad for a competitive fighting game. In another example, a user may prefer a short directional input stick for controlling a camera angle in a third-person adventure game and a taller directional input stick for precise aiming in a first-person shooting game.

In some implementations, at least a contact surface of a directional input device is selectively replaceable by the user to customize the directional input device to the user's preference. In some implementations, a user may prefer a particular material for the contact surface, such as a hard plastic for a directional input pad and a high friction rubber for a directional input stick. In some implementations, a user may prefer a directional input device including a low-mass plastic to facilitate rapid binary (on-off) inputs and a directional input device including a higher-mass metal for more inertia to smooth analog inputs.

In some implementations, a directional input device has a base and a contact surface. Forces applied to the contact surface by the user may move the base, and the electronic device controller may interpret the movement and/or position of the base to register user directional inputs to the game. In some implementations, the contact surface is the thumbstick head or joystick handle of a directional input stick. In some implementations, the contact surface is the top surface of a directional input pad.

FIG. 2-1 is a top perspective view of an implementation of a directional input stick 206 (similar to thumbstick 106 of FIG. 1) according to the present disclosure. A directional input stick 206 may have a selectively replaceable head 222. In some implementations, the head 222 and the shaft 218 are connected and replaceable together on a post 224 extending upward from the base 226. In some implementations, the shaft is connected to the base, and the head includes a post extending downward that is insertable into the shaft. The interface between the base 226 and the replaceable head 222 or other contact surface includes a twist-lock mechanism to retain the head 222 in the axial direction along the center axis 220 of the directional input stick 206. In some embodiments, the twist-lock mechanism including a post 224 and a receiver 228 is located axially within the shaft 218.

In some implementations, a directional input stick 206 has a center axis 220 that follows the center of a shaft 218 and a head 222 projecting above a body of the controller (e.g., the top face 116 of FIG. 1). The user may apply forces to the head 222 to move the directional input stick 206. The directional input stick 222 has a rotational range of motion defined by the angular motion of the center axis 220 as the directional input stick moves toward the edge of an aperture in the body in response to the force applied by the user. In some implementations, the range of motion is limited by a contact of the outer surface of the shaft 218 and body at the edge of the aperture.

In some implementations, the head 222 includes a textured or ribbed surface to improve the user's grip on the head 222 during use and limit slipping of the user's thumb or hand on the head 222. In some implementations, the head 222 includes concentric ribbing or other surface textures to provide a range of options for a user through replaceable heads. In some implementations, different heads allow the use of different materials. In some implementations, the shaft 218 is replaceable with the head 222, allowing the user to customize the shaft material, as well.

In some implementations, the shaft material includes a damping material on a radially outward side of the shaft. The damping material may include synthetic rubber, natural rubber, other elastomers, soft polymers, or other materials that cushion and/or dissipate the impact of the directional input stick contacting the body of the controller.

The softer material of the damping material may wear more rapidly than a harder material due to friction between the directional input stick and the body of the controller during use, however. For example, the user may tilt the directional input stick through the rotational range of motion (e.g., tilt the center axis of the directional input stick) and compress the damping ring between the shaft and the body of the controller. If the user then sweeps the directional input stick in an arc around a portion of the aperture edge, the relatively soft damping material may resist sliding due to friction therebetween.

In some implementations, the shaft material includes a bearing material. In some implementations, the bearing material has a lower coefficient of friction against the body material than a damping material. In some implementations, the bearing material is a lubricious layer. The bearing material allows the shaft to slide across the body of the controller during use of the directional input stick. The bearing material may include polymers such as polyoxymethylene, polytetrafluoroethylene, polycarbonate, or acrylonitrile butadiene styrene; ceramic materials; metal alloys; and other low-friction materials.

The twist-lock mechanism between the head and the base fixes the position of the head in the longitudinal direction along the center axis of the directional input device. While the controller registers the tilt of the center axis relative to the body of the controller to interpret directional inputs, the base is not rotatable around the center axis. Referring now to FIG. 2-2, the implementation of a directional input stick 206 of FIG. 2-1 is illustrated from a bottom perspective view. In some implementations, the twist-lock mechanism, in some implementations, engages by rotation of the post 224 around the center axis 220 within a complementarily shaped receiver 228. For example, a post 224 may protrude from the base 226 and the receiver 228 may be positioned in the shaft 218 connected to the head 222. In other examples, a post may protrude from the head and the receiver may be positioned in the shaft connected to the base. In yet other examples, a post may protrude from the shaft connected to the head and the receiver may be positioned in the base. In yet other examples, a post may protrude from the shaft connected to the base and the receiver may be positioned in the head.

In some implementations, the post 224 has at least one flange 230 protruding from the post 224 in a radial direction relative to the center axis 220. In some implementations, the post 224 has at least two flanges 230 symmetrically positioned on the post 224 with equal angular intervals therebetween. For example, a post with two radially protruding flanges has the two flanges positioned at 180° intervals around the center axis. In another example, a post with three radially protruding flanges has the three flanges positioned at 120° intervals around the center axis. A post with symmetrically spaced flanges allows for the post to be inserted into a complementarily shaped receiver in a plurality of positions. This can be convenient for a rotationally symmetric head or a cross-shaped directional pad with 90° symmetry. In some implementations, the post has asymmetrically spaced flanges (e.g., three flanges with 100°, 160°, and 100° angular spacing therebetween around the center axis) allows for the post to be inserted into a complementarily shaped receiver in a single orientation. By requiring the head or pad to be inserted and connected at a specific orientation, an asymmetric contact surface, such as an asymmetric directional input pad, may be used while ensuring the asymmetric contact surface ends in the intended orientation.

After inserting the post 224 and flanges 230 into the complementarily shaped receiver, the post 224 is rotated into angularly oriented (e.g., rotationally oriented) channels inside the receiver 228 proximate the head 222. In some implementations, upon rotation of the post 224, the flanges 230 contact an axial surface (relative to the center axis 220) of the receiver channels, which applies an axial force to retain the post 224 in the receiver 228. To limit and/or prevent unintentional relative rotation of the post 224 and receiver 228 (e.g., the flanges 230 moving angularly within the channels) during use, which could release the post 224 and flanges 230 in the receiver 228, the directional input device may include one or more rotational locks.

Referring again to FIG. 2-1, in some implementations, a detent 232 or other recess is located on an axial surface 234 around a bottom of the post 224. A complementarily shaped protrusion 236, illustrated in FIG. 2-2, is positioned on a second axial surface 238 of the shaft 218 or another portion with the receiver 228. Upon relative rotation of the post 224 and receiver 228 around the center axis 220 to engage the axial surface(s) of the flange 230 and the receiver channels, the protrusion 236 may rotationally align with the detent 232 or other recess. The protrusion 236 may settle into the detent 232 and resist rotation of twist-lock mechanism, limiting or preventing unintentional disengagement of the head 222 from the base 226.

In some implementations, the protrusion 236 elastically deforms to compress before entering the detent 232. In some implementations, the axial surface 234 around the bottom of the post 224 elastically deforms to accommodate the protrusion 236 before the protrusion 236 enters the detent 232. To facilitate the elastic deformation of the protrusions 236 and/or the axial surface 234 proximate the detent, in some implementations, the direction input device includes a ramped recess 240 rotationally adjacent to the detent 232. A rotationally adjacent ramped recess 240 is located at a substantially equal radius from the center axis 220 as the detent 232, such that the protrusion 236 may be positioned in the ramped recess 240 and moved from the ramped recess 240 toward the detent 232 by relative rotation of the post 224 and receiver 228. The ramped recess 240 has an axial depth that is at least an axial height of the protrusion 236, with a ramp 242 located proximate the detent 232 in the locking rotational direction. The protrusion 236 can be positioned in the ramped recess 240, and, during relative rotation of the post 224 and receiver 228, the protrusion 236 will contact the ramp 242, which applies an increasing axial force as the protrusion 236 travels up the ramp 242 in the locking rotational direction. The protrusion 236 and/or axial surface 234 around the post 224 may elastically deform under the force until the protrusion 236 reaches the detent 232, when the protrusion will elastically restore and rest in the detent 232.

In some implementations, the protrusion 236 and/or the detent 232 includes a rounded or angled edge or surface that also functions as a ramp. The interaction of the protrusion 236 and/or the detent 232 with the rounded or angled edge or surface can generate an axial compression force to elastically deform the material upon an unlocking torque applied between the post and receiver around the center axis 220. In some implementations, the unlocking torque needed to deform the material and move the protrusions 236 out of the detents 232 to unlock the twist-lock mechanism is greater than a locking torque needed to deform the material (using the ramped recess 240) and move the protrusions 236 into the detents 232 to lock the twist-lock mechanism.

While the example described above includes a receiver 228 positioned in the shaft 218 and a post 224 positioned on the base 226, in other implementations, the interface of the post and receiver may be arranged differently, as described herein, such as a receiver positioned in the shaft connected to the base and a post protruding axially from the head. In some implementations, the receiver positioned in the shaft and a post positioned on the base with the detent and ramped recess positioned in an axial surface of the shaft and the protrusions protruding axially from the axial surface around the post.

Figure 3:
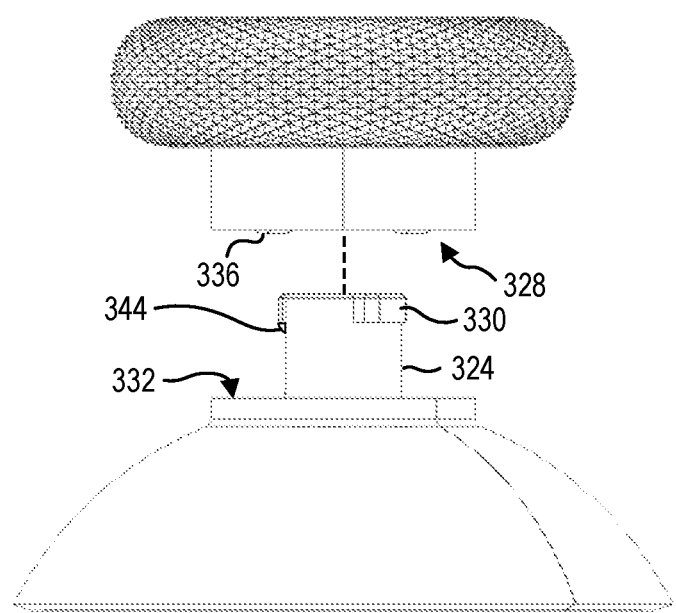
FIG. 3 is a side exploded view of a twist-lock directional input stick, according to at least some implementations of the present disclosure.

In some implementations, the twist-lock mechanism includes no ramps on the axial surfaces of the base or shaft. In some implementations, such as illustrated in FIG. 3, the twist-lock mechanism includes a ramped leading edge 344 of the flange 330 that, when initially inserted and rotated in the receiver 328, may generate an axial compression force through the interaction of the ramped leading edge 344 and the channel in the receiver 328. In some implementations, the flange 330 acts as the ramp to elastically compress the protrusion, shaft, or base material to allow the protrusions 336 to move rotationally into the detents 332. Because the ramp assists the compression in the locking rotational direction, in some implementations, a directional input device with interchangeable contact surfaces according to the present disclosure requires less locking torque to lock to the base than unlocking torque to unlock from the base.

Figure 4:
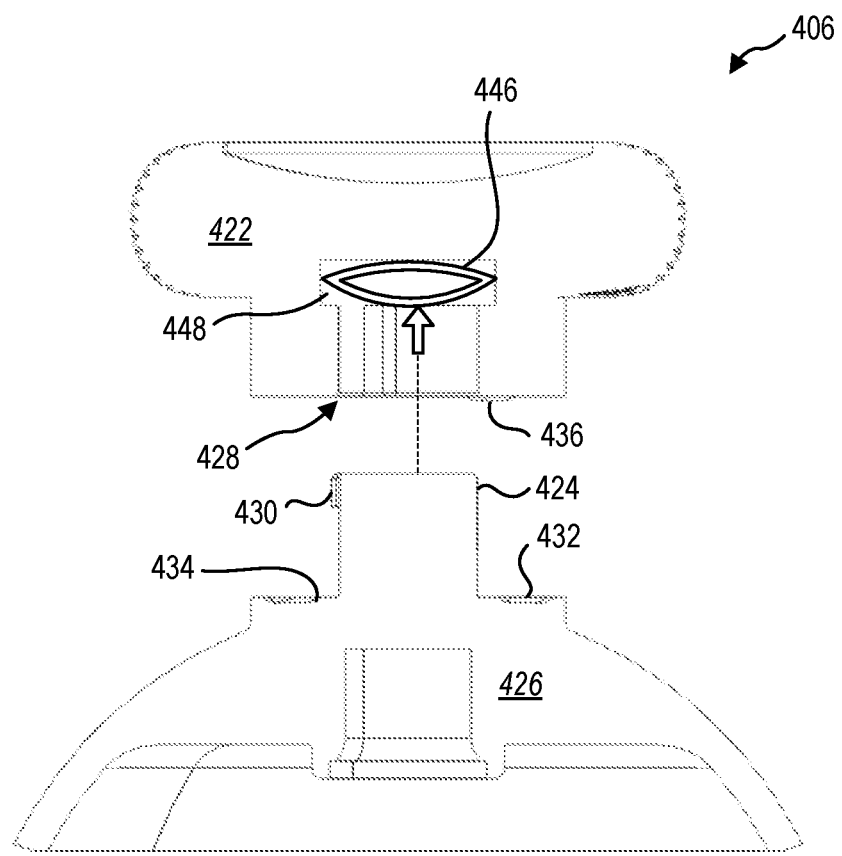
FIG. 4 is a side cross-sectional exploded view of a spring-loaded twist-lock directional input stick, according to at least some implementations of the present disclosure.

FIG. 4 is a side cross-sectional view of an implementation of directional input stick 406 with no ramp surfaces. In some implementations, the protrusion, shaft, and base materials are rigid and do not substantially deform upon application of axial force. In some implementations, twist-lock mechanism may include an axial biasing element 446 that allows rotation while generating an axial force to urge the protrusions 436 into the detents 432. In some implementations, the axial biasing element 446 is positioned in the receiver 428 to contact an end of the post 424 and apply an axial force thereto. In some implementations, the axial biasing element 446 is positioned at an end of the post to contact the receiver and apply an axial force thereto. In some implementations, the axial biasing element is a positioned at a bottom of the post to allow the post to move axially relative to the base 426 (or other portion to which the post is connected).

In some implementations, the axial biasing element 446 is a leaf spring, as illustrated in FIG. 4. In some implementations, the axial biasing element is a coil spring. In some implementations, the axial biasing element includes a compressible gas chamber. In some implementations, the axial biasing element includes a magnet. In some implementations, the axial biasing element is a bushing or other elastic material.

The axial biasing element 446 will allow the post 424 to insert into the receiver 428 far enough in an axial direction for the flanges 430 to rotate into the channels 448 of the receiver 428. When the flanges 430 rotate in the channels 448, the protrusions 436 may move rotationally over an axial surface 434 adjacent the detents. When the protrusions 436 align with the detents 432, the protrusions 436 will engage with and enter into the detents 432 based at least partially upon the axial force applied by the axial biasing element 446 to the post 424. As described herein, the curved surface of the protrusions 436 and/or the detents 432 may provide a ramping effect to compress the axial biasing element 446 under application of torque to the head 422 relative to the based 426, allowing the twist-lock mechanism to be unlocked and the head 422 removed.

Figure 5:
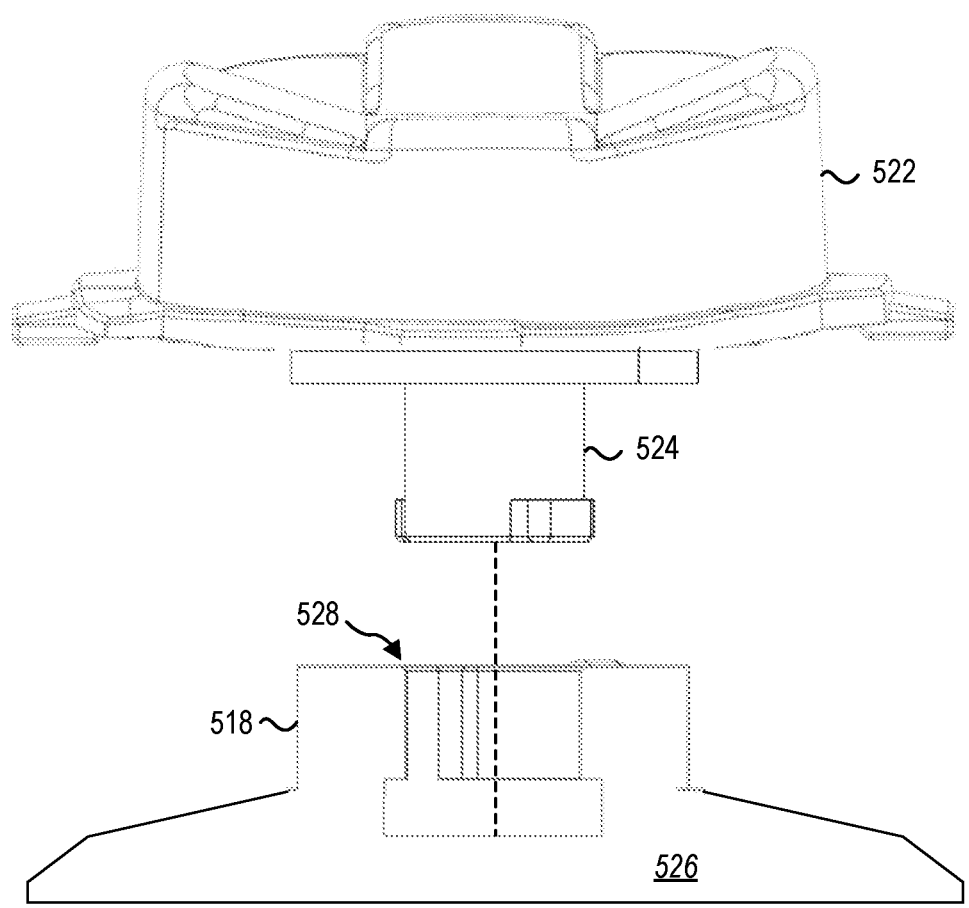
FIG. 5 is a side partial cross-sectional exploded view of a twist-lock directional input pad, according to at least some implementations of the present disclosure.

In some implementations, such as illustrated in FIG. 5, a twist-lock mechanism of a direction input device described herein connects a directional input pad (D-pad) to a base 526. The base 526 is connected to one or more switches or sensors (e.g., a potentiometer) to measure the movement or force applied to the base 526 by the D-pad. In some implementations, the base 526 supports the D-pad, and the D-pad head applies force to the switches or sensors independently of the base 526. As described herein, the post may be connected to the base and inserted into a receiver in the shaft or head. In some implementations of a D-pad contact surface, the head 522 is the D-pad, and therefore, is too thin in the axial direction to receive the post. In some implementations, the post 524 protrudes from the head 522 and connects to a receiver 528 in the base 526 and/or a shaft 518 connected to the base 526.

While rotationally symmetrical heads have been described herein, which allow for the post and receiver to be rotated relative to one another through a plurality of orientations and angular relationships, in some implementations, the head is asymmetrical or has no more than one-fold rotational symmetry around the center axis. Asymmetrical heads or those that have no more than one-fold rotational symmetry around the center axis, such an asymmetrical D-pad illustrated in FIG. 5, may be intended to be used in a particular orientation. A twist-lock mechanism according to the present disclosure may have a post with flanges that lack any rotational symmetry about the center axis beyond 360° symmetry. For example, a post with two identical flanges (e.g., having the same arc length around the post) oriented opposite one another at 180° has 180° symmetry or two-fold rotational symmetry, as illustrated in and described in relation to FIG. 2-1 and FIG. 2-2. In another example, a post with three identical flanges (e.g., having the same arc length around the post) oriented opposite one another at 120° has 120° symmetry or three-fold rotational symmetry.

Figure 6:
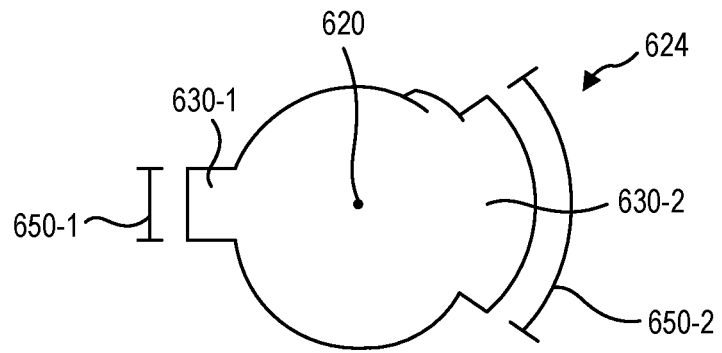
FIG. 6 is a top view of an asymmetric flange for a twist-lock directional input device, according to at least some implementations of the present disclosure.
Figure 7:
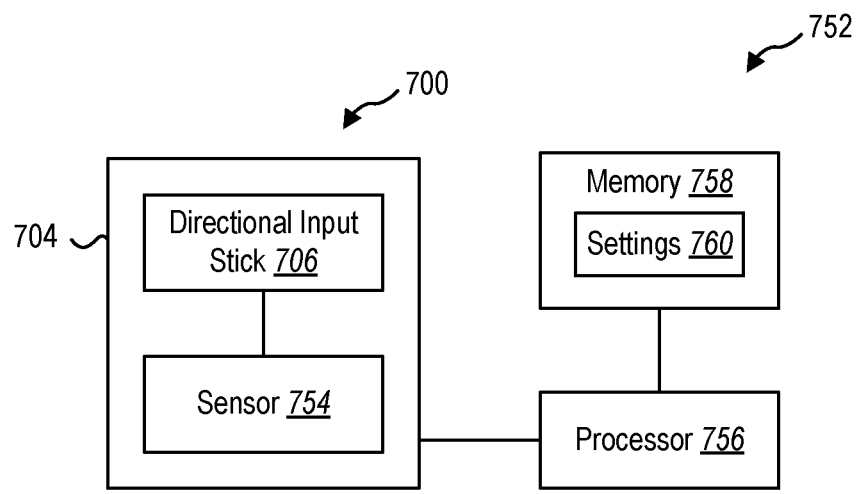
FIG. 7 is a schematic illustration of an electronic device controller system used to determine input magnitudes from a directional input device, according to at least some implementations of the present disclosure.

In some implementations, such as illustrated in FIG. 6, a post 624 (and complementarily shaped receiver not shown) may be asymmetric or have 360° rotational symmetry around a center axis 620, such that the post 624 can only be inserted into a complementarily shaped receiver at a single orientation. In the axial end view of FIG. 6, the post 624 includes a first flange 630-1 with a first arc length 650-1 and a second flange 630-2 with a second arc length 650-2 that is different from the first arc length 650-1. The implementation of a post of FIG. 6 has 360° or one-fold rotational symmetry around the center axis 620, and, therefore, can only be inserted into a complementary shaped receiver in a single orientation. The single orientation will ensure that an asymmetric head is aligned in an intended orientation upon locking of the head to the base. For example, the orientation upon insertion may be 90° from the intended orientation of the asymmetric head, and the rotation of the twist-lock mechanism to engage the flanges with the receiver may move the head through a 90° arc to orient the asymmetric head in the intended orientation.

In some implementations, the shaft is replaceable with different shafts of various thicknesses to vary the range of motion of the directional input stick, as described herein. The user may adjust one or more settings in the firmware or software in communication with the electronic device controller to adjust the magnitude of the direction inputs based on the shaft diameter.

In some implementations, an electronic device controller system 752 has adjustable directional input magnitudes. In some implementations, a potentiometer or other positional sensor 754 measures a position of a directional input stick 706 relative to a body 704 of the electronic device controller 700. The sensor 754 is in data communication with a processor 756. In some implementations, the processor 756 is incorporated into and/or part of the electronic device controller 700. In some implementations, the processor 756 is in data communication with, but independent of, the electronic device controller 700. The processor 756 is configured to access a memory storage device 758 having input stick settings 760 stored thereon. In some implementations, the input stick settings 760 include information regarding how the processor 756 interprets measurements from the sensor 754. For example, the input stick settings 760 may include a neutral deadzone for the center position of the directional input stick 706 to ignore small deviations from the neutral position. A neutral deadzone can prevent unintended inputs and limit the effects of drift in the sensor 754.

In some implementations, the settings 760 include input coefficients and/or limit values. For example, an input coefficient can instruct the processor 756 to multiply the received measurement from the sensor 754 by the input coefficient to determine the magnitude of the directional input from the directional input stick 706. In an example, a movement of the directional input stick 706 to contact the body 704 of the electronic device controller 700 may produce a measurement of 1.0 at the sensor 754 and a movement of the directional input stick 706 of 50% of the way to the edge of the aperture in the body 704 may produce measurement of 0.5. With an input coefficient of 2.0, the 50% position of the directional input stick 706 is measured, by the sensor 754, to be 0.5 but determined, by the processor 756, to be a 1.0 magnitude directional input.

A limit value of the settings 760 may instruct the processor 756 to limit a calculated magnitude to a particular value, irrespective of the measured value at the sensor 754. In the previous example, a measurement of the directional input stick 706 at 0.8 by the sensor 754 would be determined, by the processor 756, to have a magnitude of 1.6. In some implementations, a limit value can limit the magnitude of the determined input to 1.0. The result would be a system that interprets inputs up to 50% of the range of motion of the directional input stick 706 to be twice the measured input but limits the input to a maximum directional input magnitude of 1.0. A shaft that limits the range of motion of the directional input stick 706 by 50% would, therefore, reduce the amount of movement needed to input a 1.0 magnitude input, while having no other limiting effect on the inputs.

Implementations of interchangeable contact surfaces and shafts for directional input devices according to the present disclosure may provide additional degrees of customization to tune the feel and performance of the directional input device to a user or application.

INDUSTRIAL APPLICABILITY

The present disclosure relates generally to systems and methods for providing user inputs to an electronic device. More particularly, the input devices described herein are configured to allow directional inputs to a computing device or a specialized video game console. In some implementations, an input device according to the present disclosure is an electronic device controller that may be in data communication with an electronic device, such as a personal computer or video game console. In some implementations, a controller is in data communication via a wired data connection. In other implementations, the controlled is in wireless data communication.

Controllers include directional input devices to allow a user to indicate a direction an on-screen cursor or avatar should move relative to an environment. In some instances, an analog or digital thumbstick is appropriate to provide directional inputs to move an avatar in a relation to a three-dimensional virtual environment. For example, the analog thumbstick allows a gradient of input magnitudes with an associated directional component that allows for control of an avatar from a slow walk through a full run in the virtual environment.

In other instances, a cross-shaped directional input pad is appropriate to provide discrete directional control. For example, an analog input device can be unpredictable for a user in a menu selection screen with discrete options. Inputs from the analog input device may produce no movement of a cursor between the discrete options until a threshold of the analog input device is met, at which point the cursor may move unexpectedly, producing imprecise control for the user. In other examples, some applications and video games interpret series of discrete directional inputs as special commands that evoke unique techniques of the user's avatar or unlock additional features of the application or video game. In at least one example, a fighting video game interprets a precise series of directional inputs as a special command to attack using a projectile attack. In other examples, a particular series of directional inputs provided by a user at a menu screen unlocks additional options or resources.

The size, shape, texture, or other properties that affect the range of movement or the feeling of a directional input device, such as directional input stick or a directional input pad, may be changed by changing a portion of the directional input device that the user touches. Different users may prefer directional input devices with different sizes, shapes, textures, or symmetry. In some examples, a user may prefer different directional input devices for different games. For example, a user may prefer a cross-style directional input pad for a classic arcade game, such as Tetris, and a dish-style directional input pad for a competitive fighting game. In another example, a user may prefer a short directional input stick for controlling a camera angle in a third-person adventure game and a taller directional input stick for precise aiming in a first-person shooting game.

In some implementations, at least a contact surface of a directional input device is selectively replaceable by the user to customize the directional input device to the user's preference. In some implementations, a user may prefer a particular material for the contact surface, such as a hard plastic for a directional input pad and a high friction rubber for a directional input stick. In some implementations, a user may prefer a directional input device including a low-mass plastic to facilitate rapid binary (on-off) inputs and a directional input device including a higher-mass metal for more inertia to smooth analog inputs.

In some implementations, a directional input device has a base and a contact surface. Forces applied to the contact surface by the user may move the base, and the electronic device controller may interpret the movement and/or position of the base to register user directional inputs to the game. In some implementations, the contact surface is the thumbstick head or joystick handle of a directional input stick. In some implementations, the contact surface is the top surface of a directional input pad.

A directional input stick may have a selectively replaceable head. In some implementations, the head and the shaft are connected and replaceable together on a post extending upward from the base. In some implementations, the shaft is connected to the based, and the head includes a post extending downward that is insertable into the shaft. The interface between the base and the replaceable head or other contact surface includes a twist-lock engagement to retain the head in the longitudinal direction along the center axis of the directional input device.

In some implementations, a directional input stick has a center axis that follows the center of a shaft and a head projecting above a body of the controller. The user may apply forces to the head to move the directional input stick. The directional input stick has a rotational range of motion defined by the angular motion of the center axis as the directional input stick moves toward the edge of an aperture in the body in response to the force applied by the user. In some implementations, the range of motion is limited by a contact of the outer surface of the shaft and body at the edge of the aperture.

In some implementations, the head includes a textured or ribbed surface to improve the user's grip on the head during use and limit slipping of the user's thumb or hand on the head. In some implementations, the head includes concentric ribbing or other surface textures to provide a range of options for a user through replaceable heads. In some implementations, different heads allow the use of different materials. In some implementations, the shaft is replaceable with the head, allowing the user to customize the shaft material, as well.

In some implementations, the shaft material includes a damping material on a radially outward side of the shaft. The damping material may include synthetic rubber, natural rubber, other elastomers, soft polymers, or other materials that cushion and/or dissipate the impact of the directional input stick contacting the body of the controller.

The softer material of the damping material may wear more rapidly than a harder material due to friction between the directional input stick and the body of the controller during use, however. For example, the user may tilt the directional input stick through the rotational range of motion (e.g., tilt the center axis of the directional input stick) and compress the damping ring between the shaft and the body of the controller. If the user then sweeps the directional input stick in an arc around a portion of the aperture edge, the relatively soft damping material may resist sliding due to friction therebetween.

In some implementations, the shaft material includes a bearing material. In some implementations, the bearing material has a lower coefficient of friction against the body material than a damping material. In some implementations, the bearing material is a lubricious layer. The bearing material allows the shaft to slide across the body of the controller during use of the directional input stick. The bearing material may include polymers such as polyoxymethylene, polytetrafluoroethylene, polycarbonate, or acrylonitrile butadiene styrene; ceramic materials; metal alloys; and other low-friction materials.

The twist-lock mechanism between the head and the base fixes the position of the head in the longitudinal direction along the center axis of the directional input device. While the controller registers the tilt of the center axis relative to the body of the controller to interpret directional inputs, the base is not rotatable around the center axis. The twist-lock mechanism, in some implementations, engages by rotation of the post (or other contact surface) around the center axis within a complementarily shaped receiver. For example, a post may protrude from the base and the receiver may be positioned in the shaft connected to the head. In other examples, a post may protrude from the head and the receiver may be positioned in the shaft connected to the base. In yet other examples, a post may protrude from the shaft connected to the head and the receiver may be positioned in the base. In yet other examples, a post may protrude from the shaft connected to the base and the receiver may be positioned in the head.

In some implementations, the post has at least one flange protruding from the post in a radial direction relative to the center axis. In some implementations, the post has at least two flanges symmetrically positioned on the post with equal angular intervals therebetween. For example, a post with two radially protruding flanges has the two flanges positioned at 180° intervals around the center axis. In another example, a post with three radially protruding flanges has the three flanges positioned at 120° intervals around the center axis. A post with symmetrically spaced flanges allows for the post to be inserted into a complementarily shaped receiver in a plurality of positions. This can be convenient for a rotationally symmetric head or a cross-shaped directional pad with 90° symmetry. In some implementations, the post has asymmetrically spaced flanges (e.g., three flanges with 100°, 160°, and 100° angular spacing therebetween around the center axis) allows for the post to be inserted into a complementarily shaped receiver in a single orientation. By requiring the head or pad to be inserted and connected at a specific orientation, an asymmetric contact surface, such as an asymmetric directional input pad, may be used while ensuring the asymmetric contact surface ends in the intended orientation.

After inserting the post and flanges into the receiver, the post is rotated into channels inside the receiver. In some implementations, upon rotation of the post, the flanges contact an axial surface (relative to the center axis) of the receiver and applies an axial force to retain the post in the receiver. To limit and/or prevent relative rotation of the post and receiver, which could release the post and flanges in the receiver, the directional input device may include one or more rotational locks.

In some implementations, a detent or other recess is located on an axial surface around a bottom of the post. A complementarily shaped protrusion is positioned on a second axial surface of the shaft or other portion with the receiver. Upon relative rotation of the post and receiver around the center axis to engage the axial surface(s) of the flange and the receiver, the protrusion may rotationally align with the detent or other recess. The protrusion may settle into the recess and resist rotation of twist-lock mechanism, limiting or preventing unintentional disengagement of the head from the base.

In some implementations, the protrusion elastically deforms to compress before entering the detent. In some implementations, the axial surface around the bottom of the post elastically deforms to accommodate the protrusion before the protrusion enters the detent. To facilitate the elastic deformation of the protrusions and/or the axial surface proximate the detent, in some implementations, the direction input device includes a ramped recess rotationally adjacent to the detent. A rotationally adjacent ramped recess is located at a substantially equal radius from the center axis as the detent, such that the protrusion may be positioned in the ramped recess and moved from the ramped recess toward the detent by relative rotation of the post and receiver. The ramped recess has an axial depth that is at least an axial height of the protrusion, with a ramp located proximate the detent. The protrusion can be positioned in the ramped recess, and, during relative rotation of the post and receiver, the protrusion will contact the ramp, which applies an increasing axial force as the protrusion travels up the ramp in the rotational direction. The protrusion and/or axial surface around the post may elastically deform under the force until the protrusion reaches the detent, when the protrusion will elastically restore and rest in the detent.

In some implementations, the protrusion and/or the detent includes a rounded or angled edge or surface that also functions as a ramp. The interaction of the protrusion and/or the detent with the rounded or angled edge or surface can generate an axial compression force to elastically deform the material upon an unlocking torque applied between the post and receiver. In some implementations, the unlocking torque needed to deform the material and move the protrusions out of the detents to unlock the twist-lock mechanism is greater than a locking torque needed to deform the material (using the ramped recess) and move the protrusions into the detents to lock the twist-lock mechanism.

While the example described above includes a receiver positioned in the shaft and a post positioned on the base, in other implementations, the interface of the post and receiver may be arranged differently, as described herein, such as a receiver positioned in the shaft connected to the base and a post protruding axially from the head. In some implementations, the receiver positioned in the shaft and a post positioned on the base with the detent and ramped recess positioned in an axial surface of the shaft and the protrusions protruding axially from the axial surface around the post.

In some implementations, the twist-lock mechanism includes no ramps on the axial surfaces of the base or shaft. For example, the twist-lock mechanism may include a ramped leading edge of the flange surface that, when initially inserted and rotated in the receiver, may generate an axial force through the interaction of the leading edge and the recess in the receiver. In some implementations, the flange acts as the ramp to elastically compress the protrusion, shaft, or base material to allow the protrusions to move rotationally into the detents. Because the ramp assists the compression in the locking rotational direction, in some implementations, a directional input device with interchangeable contact surfaces according to the present disclosure requires less locking torque to lock to the base than unlocking torque to unlock from the base.

In some implementations, the protrusion, shaft, and base materials are rigid and do not substantially deform upon application of axial force. In some implementations, locking mechanism may include an axial biasing element that allows rotation while generating an axial force to urge the protrusions into the detents. In some implementations, the axial biasing element is positioned in the receiver to contact an end of the post and apply an axial force thereto. In some implementations, the axial biasing element is positioned at an end of the post to contact the receiver and apply an axial force thereto. In some implementations, the axial biasing element is a positioned at a bottom of the post to allow the post to move axially relative to the base (or other portion to which the post is connected).

In some implementations, the axial biasing element is a leaf spring. In some implementations, the axial biasing element is a coil spring. In some implementations, the axial biasing element includes a compressible gas chamber. In some implementations, the axial biasing element includes a magnet. In some implementations, the axial biasing element is a bushing or other elastic material.

The axial biasing element will allow the post to insert into the receiver far enough in an axial direction for the protrusions to move rotationally over an axial surface adjacent the detents. When the protrusions align with the detents, the protrusions will engage with and enter into the detents based at least partially upon the axial force applied by the axial biasing element. As described herein, the curved surface of the protrusions and/or the detents may provide a ramping effect to compress the axial biasing element, allowing the twist-lock mechanism to be unlocked and the head removed.

In some implementations, a twist-lock mechanism described herein connects a directional input pad (D-pad) to a base. The base is connected to one or more switches or sensors (e.g., a potentiometer) to measure the movement or force applied to the base by the D-pad. As described herein, the post may be connected to the base and inserted into a receiver in the shaft or head. In some implementations of a D-pad contact surface, the head is the D-pad, and therefore, is too thin in the axial direction to receive the post. In some implementations, the post protrudes from the head and connects to a receiver in the base and/or a shaft connected to the base.

While rotationally symmetrical heads have been described herein, which allow for the post and receiver to be rotated relative to one another through a plurality of orientations and angular relationships, in some implementations, the head is asymmetrical. Asymmetrical heads, such an asymmetrical D-pad, may be intended to be used in a particular orientation. A twist-lock mechanism according to the present disclosure may have a post with flanges that lack any rotational symmetry about the center axis beyond 360° symmetry. For example, a post with two identical flanges (e.g., having the same arc length around the post) oriented opposite one another at 180° has 180° symmetry or two-fold rotational symmetry. In another example, a post with three identical flanges (e.g., having the same arc length around the post) oriented opposite one another at 120° has 120° symmetry or three-fold rotational symmetry.

In some implementations, a post (and complementarily shaped receiver) may be asymmetric or have 360° rotational symmetry, such that the post can only be inserted into a complementarily shaped receiver at a single orientation. The single orientation will ensure that an asymmetric head is aligned in an intended orientation upon locking of the head to the base. For example, the orientation upon insertion may be 90° from the intended orientation of the asymmetric head, and the rotation of the twist-lock mechanism to engage the flanges with the receiver may move the head through a 90° arc to orient the asymmetric head in the intended orientation.

In some implementations, the shaft is replaceable with different shafts of various thicknesses to vary the range of motion of the directional input stick, as described herein. The user may adjust one or more settings in the firmware or software in communication with the electronic device controller to adjust the magnitude of the direction inputs based on the shaft diameter.

In some implementations, an electronic device controller system has adjustable directional input magnitudes. In some implementations, a potentiometer or other positional sensor measures a position of a directional input stick relative to a body of the electronic device controller. The sensor is in data communication with a processor. In some implementations, the processor is incorporated into and/or part of the electronic device controller. In some implementations, the processor is in data communication with, but independent of, the electronic device controller. The processor is configured to access a memory storage device having input stick settings stored thereon. In some implementations, the input stick settings include information regarding how the processor interprets measurements from the sensor. For example, the input stick settings may include a neutral deadzone for the center position of the directional input stick to ignore small deviations from the neutral position. A neutral deadzone can prevent unintended inputs and limit the effects of drift in the sensor.

In some implementations, the settings include input coefficients and/or limit values. For example, an input coefficient can instruct the processor to multiply the received measurement from the sensor by the input coefficient to determine the magnitude of the directional input from the directional input stick. In an example, a movement of the directional input stick to contact the body of the electronic device controller may produce a measurement of 1.0 at the sensor and a movement of the directional input stick of 50% of the way to the edge of the aperture in the body may produce measurement of 0.5. With an input coefficient of 2.0, the 50% position of the directional input stick is measured, by the sensor, to be 0.5 but determined, by the processor, to be a 1.0 magnitude directional input.

A limit value of the settings may instruct the processor to limit a calculated magnitude to a particular value, irrespective of the measured value at the sensor. In the previous example, a measurement of the directional input stick at 0.8 by the sensor would be determined, by the processor, to have a magnitude of 1.6. In some implementations, a limit value can limit the magnitude of the determined input to 1.0. The result would be a system that interprets inputs up to 50% of the range of motion of the directional input stick to be twice the measured input but limits the input to a maximum directional input magnitude of 1.0. A shaft that limits the range of motion of the directional input stick by 50% would, therefore, reduce the amount of movement needed to input a 1.0 magnitude input, while having no other limiting effect on the inputs.

Implementations of interchangeable contact surfaces and shafts for directional input devices according to the present disclosure may provide additional degrees of customization to tune the feel and performance of the directional input device to a user or application.

The present disclosure relates to systems and methods for providing directional inputs according to at least the examples provided in the sections below:

[A1] In some embodiments, a directional input device includes a base and a head selectively connected to the base by a twist-lock mechanism. The head and base define a center axis of the directional input device. The twist-lock mechanism includes a post oriented in an axial direction of the center axis, at least one flange protruding in a radial direction from the post, a receiver configured to receive the post and the flange, and an angularly oriented channel in the receiver configured to allow the post and flange to rotate into the channel and capture the flange in the axial direction.

[A2] In some embodiments, the head of [A1] is a thumb-stick.

[A3] In some embodiments, the head of [A1] is a directional input pad.

[A4] In some embodiments, the directional input device of any of [A1]-[A3] further includes a rotational lock between the receiver and the post that limits and/or prevents rotation of the post relative to the receiver when in a locked position.

[A5] In some embodiments, the rotational lock of [A4] requires greater torque than a locking torque.

[A6] In some embodiments, the rotational lock of [A4] or [A5] includes at least one axial protrusion and a complementary axial detent.

[A7] In some embodiments, the rotational lock of [A6] includes a ramped recess angularly adjacent to the axial detent.

[A8] In some embodiments, the rotational lock of [A6] includes a axial biasing element configured to apply an axial force to urge the receiver away from the post.

[A9] In some embodiments, the post and at least one flange of any of [A1]-[A8] has no more than one-fold rotational symmetry around the center axis.

[A10] In some embodiments, the head of [A9] has no more than one-fold rotational symmetry around the center axis.

[B1] In some embodiments, a directional input device includes a base, a head selectively connected to the base by a twist-lock mechanism, and a shaft between the base and the head along a center axis. The twist-lock mechanism is axially within the shaft and includes a post oriented in an axial direction of the center axis, at least one flange protruding in a radial direction from the post, a receiver configured to receive the post and the flange, an angularly oriented channel in the receiver configured to allow the post and flange to rotate into the channel and capture the flange in the axial direction, and a rotational lock between the receiver and the post that limits and/or prevents rotation of the post relative to the receiver when in a locked position. The rotational lock includes at least one axial protrusion, and a complementary axial detent.

[B2] In some embodiments, the flange of [B1] has a ramped leading edge and rotation of the ramped leading edge around the center axis interacts with the channel in the receiver to apply an axial force to elastically deform at least a portion of the directional input device.

[B3] In some embodiments, the directional input device of [B1] further includes a ramped recess angularly adjacent to the detent in an axial surface around a bottom of the post, wherein relative rotation of post and the receiver around the center axis causes a ramp of the ramped recess to contact the protrusion and apply an axial force to elastically deform at least a portion of the directional input device.

[B4] In some embodiments, the protrusion of any of [B1]-[B3] is positioned on an axial surface around a bottom of the post.

[B5] In some embodiments, the post and at least one flange of any of [B1]-[B4] has no more than one-fold rotational symmetry around the center axis.

[B6] In some embodiments, the receiver of any of [B1]-[B5] is in the shaft between the head and the base.

[C1] In some embodiments, an electronic device controller includes a controller body, a directional input device, a positional sensor, a memory storage device, and a processor. The directional input device includes a base and a head selectively connected to the base by a twist-lock mechanism. The head and base define a center axis of the directional input device. The twist-lock mechanism includes a post oriented in an axial direction of the center axis, at least one flange protruding in a radial direction from the post, a receiver configured to receive the post and the flange, and an angularly oriented channel in the receiver configured to allow the post and flange to rotate into the channel and capture the flange in the axial direction. The positional sensor measures a position of the directional input device relative to the controller body. The memory storage device has input device settings stored thereon. The processor is data communication with the positional sensor and the memory storage device. The processor determines a directional input magnitude based on a positional measurement from the positional sensor and the input device settings.

[C2] In some embodiments, the input device settings of [C1] include an input coefficient.

[C3] In some embodiments, the input device settings of [C1] or [C2] include a limit value.

[C4] In some embodiments, the head of any of [C1]-[C3] is a thumb stick.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A directional input device comprising:
   a base;
   a head selectively connected to the base by a twist-lock mechanism, wherein the head and base define a center axis, the twist-lock mechanism including:
      a post oriented in an axial direction of the center axis,
      at least one flange protruding in a radial direction from the post,
      a receiver configured to receive the post and the flange, and
      an angularly oriented channel in the receiver configured to allow the post and flange to rotate into the channel and capture the flange in the axial direction.

2. The directional input device of claim 1, wherein the head is a thumbstick.

3. The directional input device of claim 1, wherein the head is a directional input pad.

4. The directional input device of claim 1, further comprising a rotational lock between the receiver and the post that limits and/or prevents rotation of the post relative to the receiver when in a locked position.

5. The directional input device of claim 4, wherein the rotational lock requires a greater unlocking torque than a locking torque.

6. The directional input device of claim 4, wherein the rotational lock includes at least one axial protrusion and a complementary axial detent.

7. The directional input device of claim 6, further comprising a ramped recess angularly adjacent to the axial detent.

8. The directional input device of claim 6, further comprising an axial biasing element configured to apply an axial force to urge the receiver away from the post.

9. The directional input device of claim 1, wherein the post and at least one flange has no more than one-fold rotational symmetry around the center axis.

10. The directional input device of claim 9, wherein the head has no more than one-fold rotational symmetry around the center axis.

11. A directional input device comprising:
    a base;
    a head selectively connected to the base by a twist-lock mechanism and wherein the head and base define a center axis;
    a shaft between the base and the head along the center axis, wherein the twist-lock mechanism is axially within the shaft, the twist-lock mechanism including:
       a post oriented in an axial direction of the center axis,
       at least one flange protruding in a radial direction from the post,
       a receiver configured to receive the post and the flange,
       an angularly oriented channel in the receiver configured to allow the post and flange to rotate into the channel and capture the flange in the axial direction, and
       a rotational lock between the receiver and the post that limits and/or prevents rotation of the post relative to the receiver when in a locked position, wherein the rotational lock includes:
          at least one axial protrusion, and
          a complementary axial detent.

12. The directional input device of claim 11, wherein the flange has a ramped leading edge and rotation of the ramped leading edge around the center axis interacts with the channel in the receiver to apply an axial force to elastically deform at least a portion of the directional input device.

13. The directional input device of claim 11, further comprising a ramped recess angularly adjacent to the detent in an axial surface around a bottom of the post, wherein relative rotation of post and the receiver around the center axis causes a ramp of the ramped recess to contact the protrusion and apply an axial force to elastically deform at least a portion of the directional input device.

14. The directional input device of claim 11, wherein the protrusion is positioned on an axial surface around a bottom of the post.

15. The directional input device of claim 11, wherein the post and at least one flange has no more than one-fold rotational symmetry around the center axis.

16. The directional input device of claim 11, wherein the receiver is positioned in the shaft between the head and the base.

17. An electronic device controller, the controller comprising:
    a controller body,
    a directional input device movable relative to the controller body, the directional input device including:
       a base,
       a head selectively connected to the base by a twist-lock mechanism, wherein the head and base define a center axis, the twist-lock mechanism including:
          a post oriented in an axial direction of the center axis, at least one flange protruding in a radial direction from the post, a receiver configured to receive the post and the flange, and an angularly oriented channel in the receiver configured to allow the post and flange to rotate into the channel and capture the flange in the axial direction;

a positional sensor configured to measure a position of the directional input device relative to the controller body;

a memory storage device, the memory storage device having input device settings stored thereon, wherein the input device settings are based at least partially on a shaft diameter of the directional input device; and a processor in data communication with the positional sensor and the memory storage device, the processor configured to determine a directional input magnitude based on a positional measurement from the positional sensor and the input device settings.

18. The electronic device controller of claim 17, wherein the input device settings include an input coefficient.

19. The electronic device controller of claim 17, wherein the input device settings include a limit value.

20. The electronic device controller of claim 17, wherein the head is a thumbstick.

* * * * *